(12) United States Patent
Salsberg

(10) Patent No.: US 12,532,864 B2
(45) Date of Patent: Jan. 27, 2026

(54) PORTABLE COMMUNICATION DEVICE FOR INITIATING COMMUNICATION BETWEEN DOG AND DOG OWNER AND METHOD FOR SAME

(71) Applicant: Paul Salsberg, Thornhill (CA)

(72) Inventor: Paul Salsberg, Thornhill (CA)

( * ) Notice: Subject to any disclaimer, the term of this patent is extended or adjusted under 35 U.S.C. 154(b) by 602 days.

(21) Appl. No.: 17/339,408

(22) Filed: Jun. 4, 2021

(65) Prior Publication Data

US 2022/0217944 A1 Jul. 14, 2022

Related U.S. Application Data

(60) Provisional application No. 63/170,527, filed on Apr. 4, 2021, provisional application No. 63/135,889, filed on Jan. 11, 2021.

(51) Int. Cl.
*A01K 15/02* (2006.01)
*A01K 27/00* (2006.01)
*G06F 3/04842* (2022.01)

(52) U.S. Cl.
CPC .......... *A01K 15/021* (2013.01); *A01K 27/006* (2013.01); *G06F 3/04842* (2013.01)

(58) Field of Classification Search
None
See application file for complete search history.

(56) References Cited

U.S. PATENT DOCUMENTS

| | | | | |
|---|---|---|---|---|
| 5,454,350 | A  * | 10/1995 | Betheil | A01K 27/006 |
| | | | | 119/858 |
| 8,543,134 | B2 * | 9/2013 | Lopez | A01K 27/009 |
| | | | | 455/442 |
| D777,998 | S  * | 1/2017 | Pantazes | D30/152 |
| 9,578,855 | B2 * | 2/2017 | Sibbald | A01K 15/02 |
| 9,668,459 | B2 * | 6/2017 | Bonge, Jr. | H04W 4/12 |
| 10,863,718 | B1 * | 12/2020 | Lazarevic | A01K 15/023 |
| 10,912,282 | B2 * | 2/2021 | McKee | A01K 11/008 |
| 10,945,008 | B2 * | 3/2021 | Tang | H04N 21/44218 |
| 2011/0297090 | A1 * | 12/2011 | Chamberlain | A01K 5/0291 |
| | | | | 119/51.02 |
| 2011/0297091 | A1 * | 12/2011 | Chamberlain | A01K 5/0291 |
| | | | | 119/702 |
| 2012/0298049 | A1 * | 11/2012 | Cook | A01K 15/025 |
| | | | | 119/707 |

(Continued)

*Primary Examiner* — Muhammad Adnan
(74) *Attorney, Agent, or Firm* — Solberg (57) ABSTRACT

A portable communication device for initiating communication between the dog and the dog owner is disclosed. The device comprises an IR emitter module projecting the series of virtual buttons on the ground and displaying images of the virtual buttons that can be pressed by the paw of the dog. A camera module is provided to record angle of infrared light emitted by the IR emitter module. A sensor module receives information of the angle of infrared light from the camera module and analyzing the information to determine location of the infrared light broken in order to indicate at least one virtual button selected by the dog from the series of virtual buttons. A processor module is configured to perform confirmation regarding selection made by the dog through and passing of information of the at least one virtual button selected by the dog to the dog owner.

20 Claims, 8 Drawing Sheets

(56) References Cited

U.S. PATENT DOCUMENTS

| | | | |
|---|---|---|---|
| 2015/0250146 A1* | 9/2015 | Bartol | A01K 27/005 |
| | | | 119/856 |
| 2015/0327514 A1* | 11/2015 | Clark | A01K 5/02 |
| | | | 119/57.92 |
| 2016/0021506 A1* | 1/2016 | Bonge, Jr. | G16H 40/63 |
| | | | 717/173 |
| 2017/0196196 A1* | 7/2017 | Trottier | A01K 29/005 |
| 2017/0318789 A1* | 11/2017 | Pantazes | A01K 11/008 |
| 2021/0251191 A1* | 8/2021 | Lee | G06K 19/07762 |
| 2021/0274315 A1* | 9/2021 | Daoura | H04W 4/06 |

* cited by examiner

PORTABLE COMMUNICATION DEVICE FOR INITIATING COMMUNICATION BETWEEN DOG AND DOG OWNER AND METHOD FOR SAME

CROSS-REFERENCE TO RELATED APPLICATION

This disclosure claims the benefit of the priority of U.S. Provisional Patent Application No. 63/170,527, entitled "Leash laser keyboard for dogs" and filed on Apr. 4, 2021. This disclosure also claims the benefit of the priority of U.S. Provisional Patent Application No. 63/135,889, entitled "Leash laser keyboard for dogs" and filed on Jan. 11, 2021. The above-identified application is incorporated herein by reference in its entirety.

FIELD OF INVENTION

Present invention relate to communication initiation devices and methods enabling humans to communicate with dogs. In particular, embodiments of the present invention relate to a portable communication device and method for initiating communication between the dog and the dog owner.

BACKGROUND OF THE INVENTION

With the advent of communication devices programmable using a software, demand of communication enablement between dog and dog owner is increasing and considered one of the primary requirements to be fulfilled. Common forms of communication employed by a dog include eye contact, facial expression, barking, and body posture. These can be easily misinterpreted. Humans have trained dogs to respond to voice control, hand signals and body postures. These however tend to be a form of a command rather than a two way communication. Of course, dogs try using these expressions to communicate with humans, assuming that we speak the same language. Some people understand what they see and some don't. Although most humans understand extremes, such as the threatening expressions and postures of attack, but the mentioned "signs" or "postures" are often overlooked or misconstrued.

Traditionally, most of the technologies involving communication between the dog and the dog owner involves array of buttons placed on the ground, and the dog is trained to press the button corresponding to the message it wishes to convey. These buttons can be effective as means of communication, but also comes with some practical drawbacks. Firstly, the array of buttons is quite large and bulky. Secondly, it is intended to be left in one place rather than being portable, as a result of which dogs and their owners need to be able to communicate regularly and in a range of locations. Many communication devices have been developed in the past that enable communication between the dog and the dog owner. An example of one of these technologies is use of a computer-aided training and management system that uses a computer or other processor in wireless communication with an instrumented dog collar and optionally one or more dog interaction devices, such as, for example, video monitors, loudspeakers, video cameras, training toys, a food dispensing and monitoring device, tracking devices, a dog monitoring doghouse a dog monitoring toilet. The instrumented dog collar is in two-way communication with a central computer system. But the major drawback in this technology is that the management system disclosed here to communicate with the dog is not portable, due to which it becomes a cumbersome task to everytime communicate wirelessly with the dog collar in order to train the dog to perform any activity. Also one of the major drawbacks is that the dogs and their owners are unable to communicate regularly and in the range of locations.

All these existing systems and methods need to achieve purpose of establishment of effective two-way communication between the dog and the dog owner by continuously monitoring the dog activities, signs and postures. When the dog activities, signs and postures are tracked remotely using any system or device then the system or device has to be enabled everytime and also needs to be portable, otherwise the entire system or device needs to be used by the user repeatedly on regular basis which is time consuming.

Therefore, there is a need for a portable communication device and method that can provide easy, efficient, timely and effective communication between the dog and the dog owner as per the dog owner requirements.

SUMMARY OF THE INVENTION

These and other problems, as mentioned above in existing communication devices and methods for initiating communication between dog and dog owner, are solved by portable communication device that utilizes a processor module initiating wireless communication between the dog and the dog owner. A collar is worn on a dogs neck and a series of virtual buttons are projected onto the ground that can be pressed with the dogs paw. The virtual buttons on the ground represents images which can be easily seen and touched by the dog. The dog is trained to recognize what each command represents and selects that command which is closest to its current needs.

In one embodiment, the portable communication device for initiating communication between dog and dog owner is provided which comprises certain software-executable hardware modules. The portable communication device comprises an IR (Infrared) emitter module projecting the series of virtual buttons on the ground and displaying images of the virtual buttons that can be pressed by the paw of the dog. A camera module is provided to record angle of infrared light emitted by the IR emitter module. A sensor module receives information of the angle of infrared light from the camera module and analyzing the information to determine location of the infrared light broken in order to indicate at least one virtual button selected by the dog from the series of virtual buttons. Lastly, the processor module initiates communication between the dog and the dog owner and is configured to perform certain operations in initiating communication between the dog and the dog owner. The processor module is configured to perform confirmation regarding selection made by the dog through pressing of at least one virtual button by the paw of the dog. The processor module is further configured to perform passing of information of the at least one virtual button selected by the dog to the dog owner. Each virtual button of the series of virtual buttons corresponds to a particular command or request. The each virtual button comprises a designated word so that the selection by the dog is understood by both the dog and the dog owner.

In an embodiments, the portable device is leash laser keyboard for dogs. In the embodiment the portable device leash emits laser virtual keyboards for dogs to as means of communication with owner. In one of the embodiment, the portable device may be in the form of dog's collar or dog's harness.

In one embodiment, the command comprises certain inputs as water, food, play, outside, potty, walk, treat, yes, no, or any other input. If the at least one virtual button is selected by the dog, infrared light emitted by the IR emitter module breaks and is reflected back towards the communication device. Angle of the IR emitter module is adjusted in an upward or downward direction in order to project the series of virtual buttons within range of the paw of the dog. The IR emitter module is activated either by the dog owner with press of the at least one virtual button or sound activated by the dog with a bark.

In another embodiment, the method for initiating communication between dog and dog owner is provided, which comprises certain operational and computing steps performed by different modules for timely and effective communication between the dog and the dog owner as per the dog owner requirements. The method comprises projecting, by the IR emitter module, the series of virtual buttons on the ground. The method further comprises displaying, by the IR emitter module, images of the virtual buttons that can be pressed by paw of the dog. The method further comprises recording, by the camera module, angle of the infrared light emitted by the IR emitter module. The method further comprises receiving, by the sensor module, information of the angle of infrared light from the camera module and analyzing the information to determine location of the infrared light broken in order to indicate the at least one virtual button selected by the dog from the series of virtual buttons. The method further comprises confirming, by the processor module, selection made by the dog through pressing of the at least one virtual button by the paw of the dog. The method lastly further comprises passing information of the at least one virtual button selected by the dog to the dog owner.

The present invention provides a number of important technical advantages. One example of an important technical advantage is that the portable communication device, and the method which are described, automatically improves the communication between the dog and the dog owner by analyzing the information to determine the portion of infrared light broken, and indicating the virtual button selected by the dog to notify the dog owner, its activity within their ecosystems or range of areas. The system automatically reduces need for continuously monitoring the dog activities, signs and postures face to face by enabling different commands corresponding to different virtual buttons.

Other features of embodiments of the present disclosure will be apparent from accompanying drawings and detailed description that follows.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description applies to any one of the similar components having the same first reference label irrespective of the second reference label.

DETAILED DESCRIPTION

The present invention discloses a portable communication device which is a collar worn around a dog's neck projecting a series of virtual buttons onto the ground that can be pressed with the dog's paw. An adjustable IR emitter is moved vertically to adjust position of display so that the dog can easily see and touch the images. There are different buttons corresponding to different commands. The dog is trained to recognize what each of the commands represents and selects the one closest to its current needs. This helps in achieving purpose of establishment of effective two-way communication between the dog and dog owner with the dog owner continuously monitoring the dog activities, signs and postures.

Figure 1A:
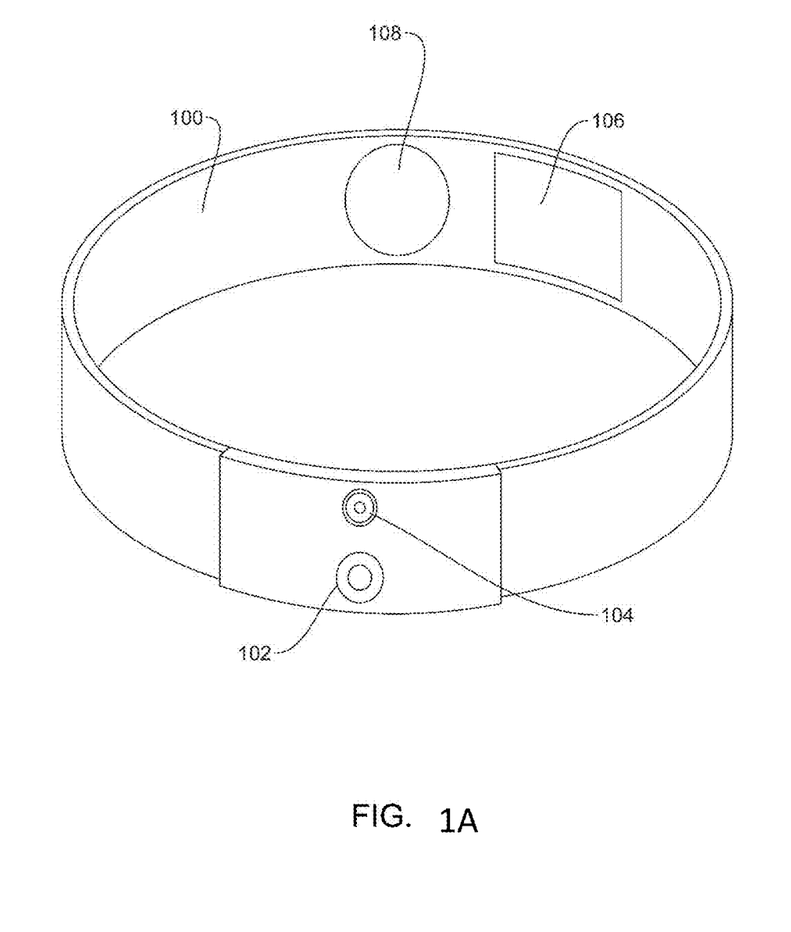
FIG. 1A illustrates a front/top view of a portable communication device in accordance with an embodiment of the present invention.

FIG. 1A illustrates a front/top view of a portable communication device in the form of a collar 100 in accordance with an embodiment of the present invention. The collar 100 which is worn over dogs neck comprises an infrared emitter or projector 102 projecting a series of virtual buttons onto the ground. As the dog touches at least one button with its paw, this interrupts the infrared beam of light. The infrared beam of light is reflected back towards the dog collar 100. An angle of the infrared beam of light is calculated by the camera 104 and this information is passed on to a sensor within the collar 100. The angle of the projector or IR emitter 102 can be adjusted up or down, so that the projection lands withion range of the dog's paw. The portable communication device 100 can be accessed by the dog owner through a network 110 (e.g., LAN, WAN, or the Internet, etc.). In an embodiment, the portable communication device includes various functional modules facilitated to perform different functions. The system includes a IR emitter module, a camera module, and a sensor module. In an embodiment, the system may further include a processor module. The processor module is configured to perform certain operational steps facilitating initiation of communication between the dog and the dog owner.

In an embodiment, the collar 100 further comprises a rechargeable battery 106 and a power supply controlled by an ON/OFF switch 108. This ON/OFF switch 108 is water resistant and there is also a speaker on the collar 100.

The detailed description set forth below in connection with the appended drawings is intended as a description of exemplary embodiments in which the presently disclosed process can be practiced. The term "exemplary" used throughout this description means "serving as an example, instance, or illustration," and should not necessarily be construed as preferred or advantageous over other embodiments. The detailed description includes specific details for providing a thorough understanding of the presently disclosed method and system. However, it will be apparent to those skilled in the art that the presently disclosed process may be practiced without these specific details. In some instances, well-known structures and devices are shown in block diagram form to avoid obscuring the concepts of the presently disclosed method and system.

Embodiments of the present invention include various steps, which will be described below. The steps may be performed by hardware components or may be embodied in machine-executable instructions, which may be used to cause a general-purpose or special-purpose processor programmed with the instructions to perform the steps.

Embodiments of the present invention may be provided as a computer program product, which may include a machine-readable storage medium tangibly embodying thereon instructions, which may be used to program the computer (or other electronic devices) to perform a process. The machine-readable medium may include, but is not limited to, fixed (hard) drives, magnetic tape, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within the single computer) and storage systems containing or having network access to a computer program(s) coded in accordance with various methods described herein, and the method steps of the invention could be accomplished by modules, routines, subroutines, or subparts of a computer program product.

The terms "communication device", "device" or "collar" and related terms are used in an operational sense and are not necessarily limited to directly communicating devices. Thus, for example, two devices may be communicating directly or via one or more intermediary media or devices. As another example, devices may be communicating in such a way that information can be passed therebetween, while not sharing any physical connection with one another. Based on the disclosure provided herein, one of ordinary skill in the art will appreciate a variety of ways in which communication exists in accordance with the aforementioned definition.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context dictates otherwise. Also, as used in the description herein, the meaning of "in" includes "in" and "on" unless the context dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein, a "target output" generally refers to various forms of data, information, services, applications, and/or hardware devices that may be accessed via a network (e.g., the Internet). Non-limiting examples of target output include web applications, cloud-based services, network devices, and/or associated applications (e.g., user interface applications), and network security devices and/or associated applications (e.g., user interface applications). Exemplary embodiment will now be described more fully hereinafter with reference to the accompanying drawings, in which exemplary embodiment is shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular name.

Figure 1B:
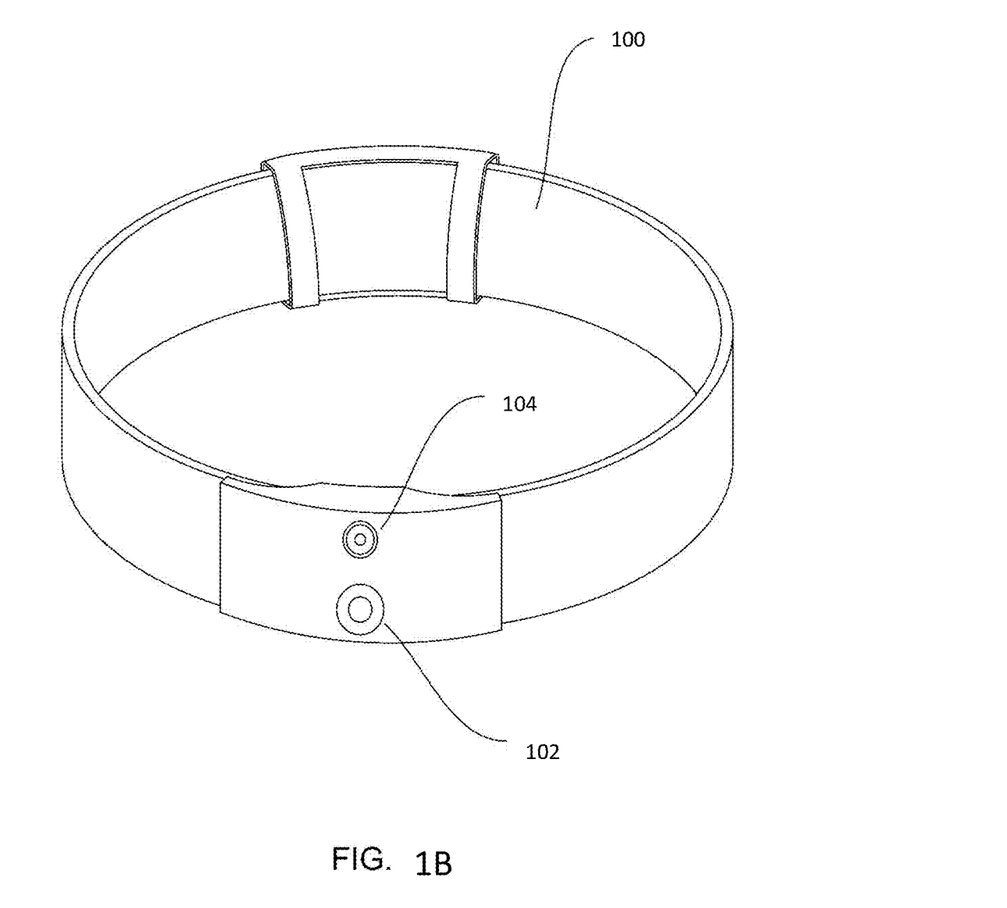
FIG. 1B illustrates a front/top view of a portable communication device in accordance with an embodiment of the present invention.

Referring to FIG. 1B illustrating the front/top view of a portable communication device 100 in accordance with the embodiment of the present invention, the device 100 comprises of an IR emitter 102 projecting a series of virtual buttons onto the ground. The angle of infrared beam of light is recorded by the camera 104 and this recorded information is passed on to a sensor within the collar 100. The sensor analyzes the information to determine the location where the infrared beam of light was broken, indicating the button selected by the dog. The collar 100 combined with a software functionality consisting of machine-readable instructions facilitates a processor to confirm the selection made by the dog using its paw and then passes this information to the dog owner.

In an embodiment, the IR emitter 102 can display a star, square, parallelogram, circle, triangle, cross, arrow up, arrow down, a heart or any other variations known in the art.

Figure 1C:
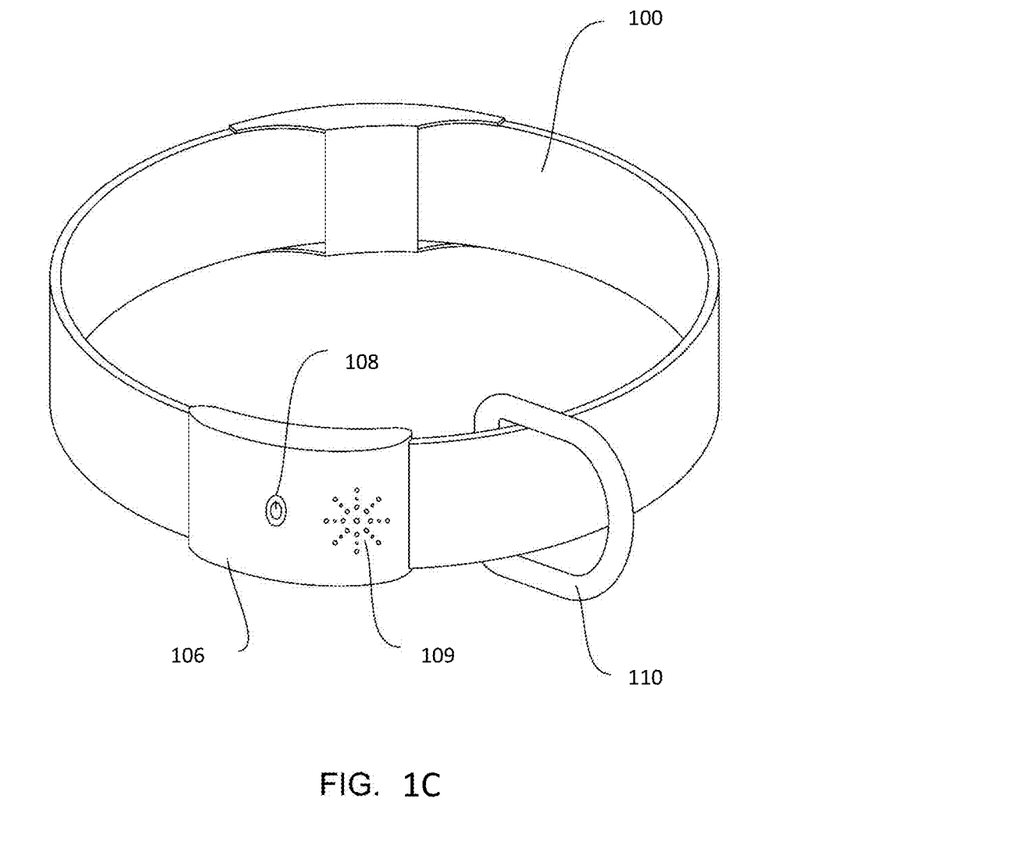
FIG. 1C illustrates a rear/top view of a portable communication device in accordance with an embodiment of the present invention.

FIG. 1C illustrates a rear/top view of a portable communication device 100 in accordance with third embodiment of the present invention. The sensor senses the location where the infrared beam of light was broken. This location indicates the at least one virtual button selected by the dog. There are many virtual buttons which are displayed onto the ground. The collar 100 of FIG. 1C has a rechargeable battery 106 which can programmable through a software and configured to charge the battery of the collar to a battery level required by the dog owner. The power supply for the collar 100 is controlled by an ON/OFF switch 108 which is water resistant and a speaker 109 is positioned on the collar 100.

In an embodiment, the collar 100 of FIG. 1C comprises a clip 110 providing an attachment point for the collar 100. Each display option selected by the dog has a designated word in it so both the dog and the owner understand the selection. The present invention may be Bluetooth compatible to change the number and style of shapes displayed, or any other variations known in the art.

Figure 2:
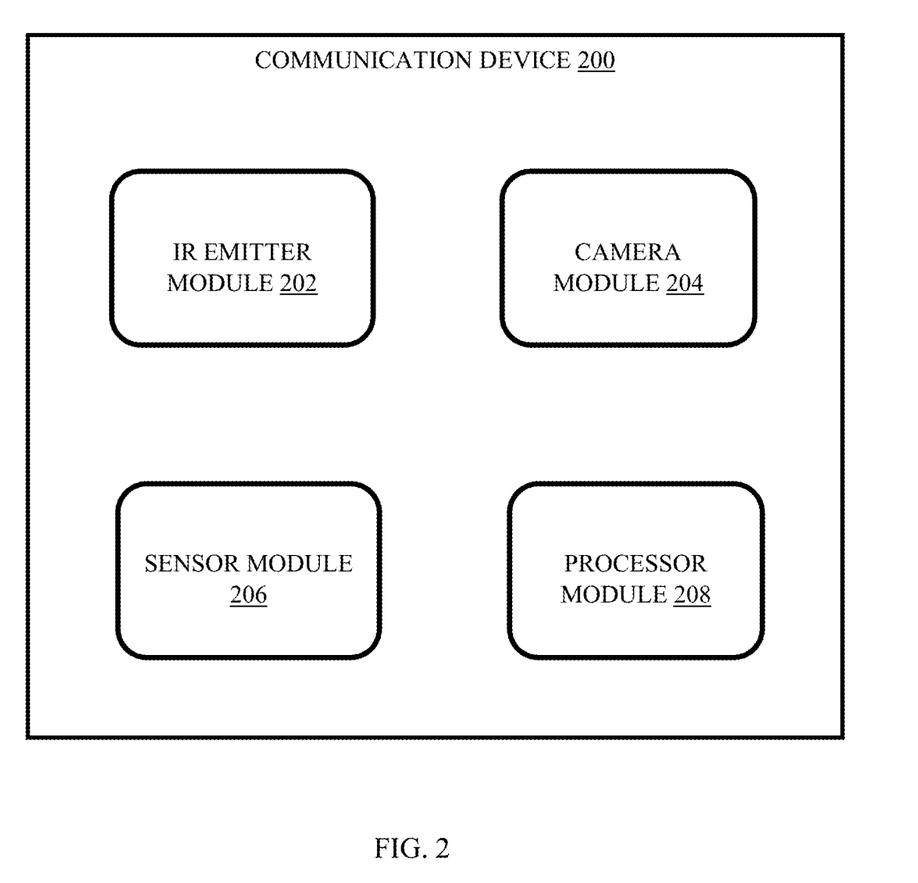
FIG. 2 is a block diagram illustrating various functional modules of the portable communication device in accordance with an embodiment of the present invention.

Referring to FIG. 2 illustrating various functional modules of the portable communication device 200, in accordance with an embodiment of the present invention, the portable communication device 200 comprises of an IR emitter module 202 projecting a series of virtual buttons on a ground and displaying images of the virtual buttons that can be pressed by paw of the dog, a camera module 204 recording angle of infrared light emitted by the IR emitter module 202 and a sensor module 206 receiving information of the angle of infrared light from the camera module 204 and analyzing the information to determine location of the infrared light broken in order to indicate at least one virtual button selected by the dog from the series of virtual buttons. The IR emitter module 202 is activated either by the dog owner with press of the at least one virtual button or sound activated by the dog with a bark. The device 200 further comprises a processor module 208 for initiating communication between the dog and the dog owner.

In an embodiment, the processor module 208 is being programmed with software-executable instructions and configured to perform operational steps which are important from perspective of communication between the dog and the dog owner. The processor module 208 is configured to perform confirming selection made by the dog through pressing of the at least one virtual button by the paw of the dog. The processor module 208 is further configured to perform passing of information of the at least one virtual button selected by the dog to the dog owner.

Figure 3:
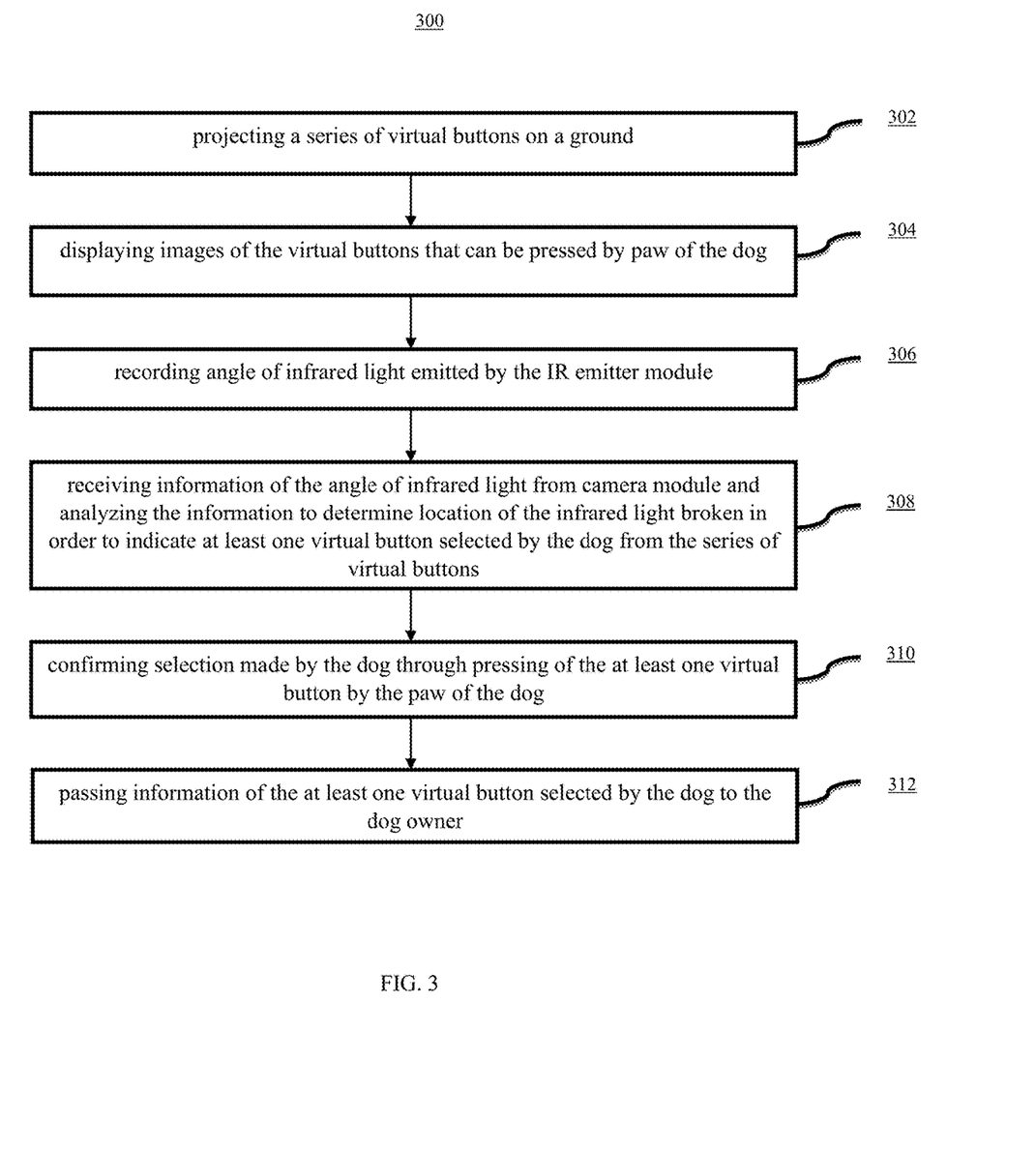
FIG. 3 illustrates a method flow diagram for initiating communication between dog and dog owner in accordance with an embodiment of the present invention.

Referring to FIG. 3 illustrating a method flow diagram for initiating communication between the dog and the dog owner in accordance with an embodiment of the present invention, the method 300 includes steps of, projecting a series of virtual buttons on a ground as shown at block 302, displaying images of the virtual buttons that can be pressed by paw of the dog as shown at block 304, recording angle of infrared light emitted by IR emitter module as shown at block 306, receiving information of the angle of infrared light from camera module and analyzing the information to determine location of the infrared light broken in order to indicate at least one virtual button selected by the dog from the series of virtual buttons as shown at block 308, confirming selection made by the dog through pressing of the at least one virtual button by the paw of the dog as shown at block 310 and lastly passing information of the at least one virtual button selected by the dog to the dog owner as shown at block 312.

Figure 4:
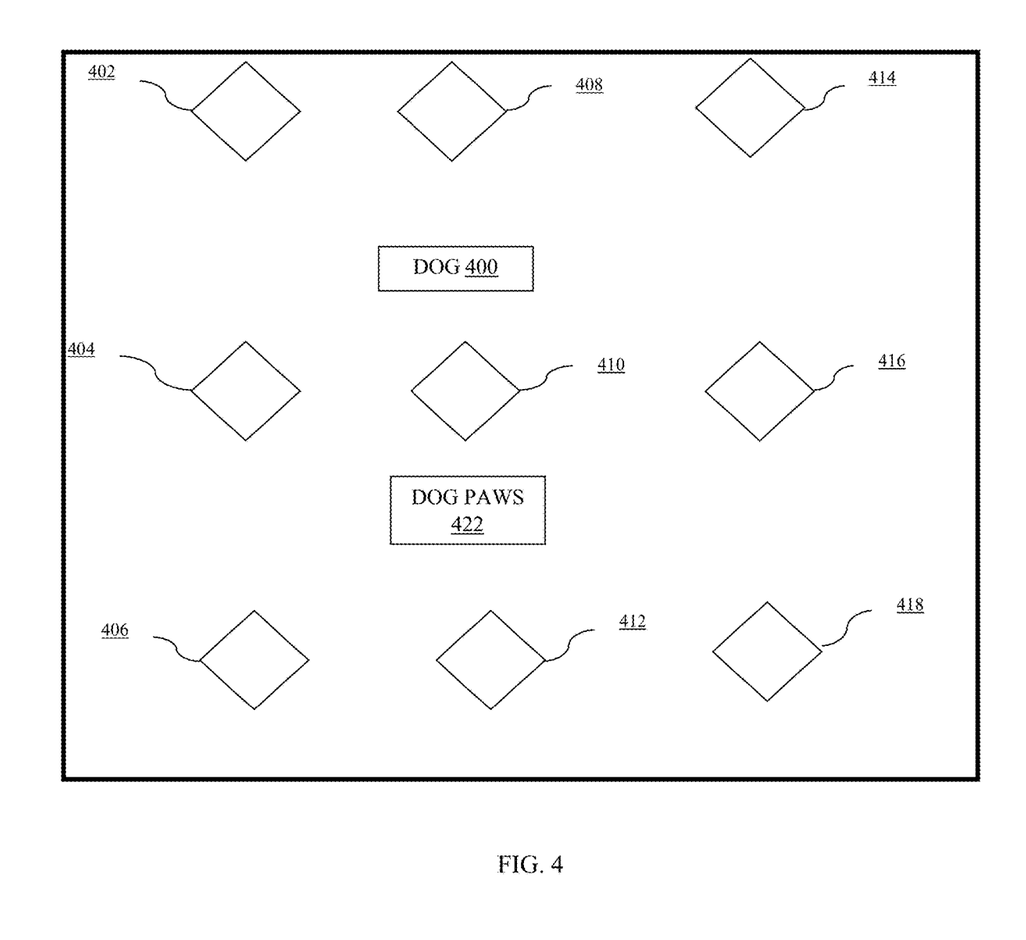
FIG. 4 is an exemplary embodiment illustrating the portable communication device worn around dogs neck in accordance with an embodiment of the present invention.

FIG. 4 is an exemplary embodiment illustrating the portable communication device 400 worn around dogs neck in accordance with an embodiment of the present invention. The communication device 400 comprises of a series of virtual buttons 402-418 displayed onto the ground by the IR emitter to be selected by the dog 420 using its paw/(s) 422. On an average, ther are nine virtual buttons shown in FIG. 4 corresponding to different commands or requests. The angle of the IR emitter can be adjusted up or down, so that the projection lands within range of the dog's paw.

In an embodiment, each virtual button of the series of virtual buttons 402-418 comprises a designated word so that the selection by the dog is understood by both the dog and the dog owner. The command comprises certain inputs as water, food, play, outside, potty, walk, treat, yes, no, or any other variation known in the art, as shown in FIG. 4. The series of virtual buttons 402-418 are displayed for approximately 15 seconds for the dog to select the shape of the at least one virtual button before the at least one virtual button gets automatically turned off. So the dog 420 selects the virtual button with the command closest to its current needs, for example, dog selects virtual button 412 which represents walk required by the dog 420.

As one will appreciate, the proposed communication device may be formed of silicone, rubber, polyurethane, polycarbonate, stainless steel, aluminium, or any other variations known in the art. The proposed method may make use of injection molding, rotational molding, compression molding, die casting, laser cutting, 3D printing, or any other variations known in the art.

The proposed invention may be used for dogs, cats, pigs, monkeys, or any other variations known in the art. The invention may be used with pet treats, pet snacks, pet food, or any other variations known in the art. The invention may be projected on to walls, floors, doors, portable screens, or any other variations known in the art. The invention may be used by pet owners, veterinarians, dog trainers, or any other variations known in the art.

Figures 5A, 5B:
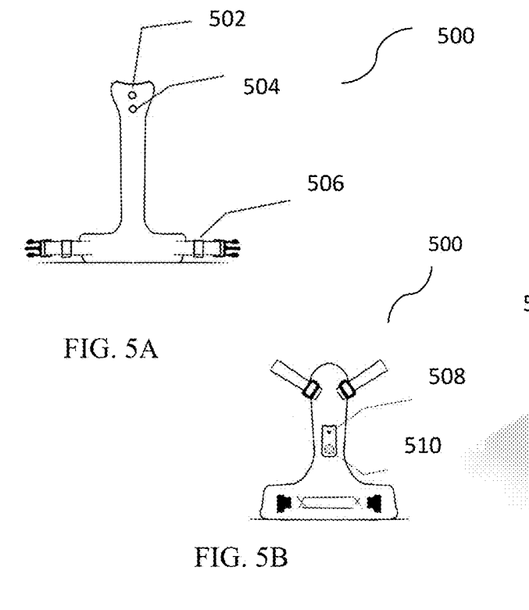
FIG. 5A-5C illustrates a portable communication device in the form of dog's harness in accordance with an embodiment of the present invention.
Figure 5C:
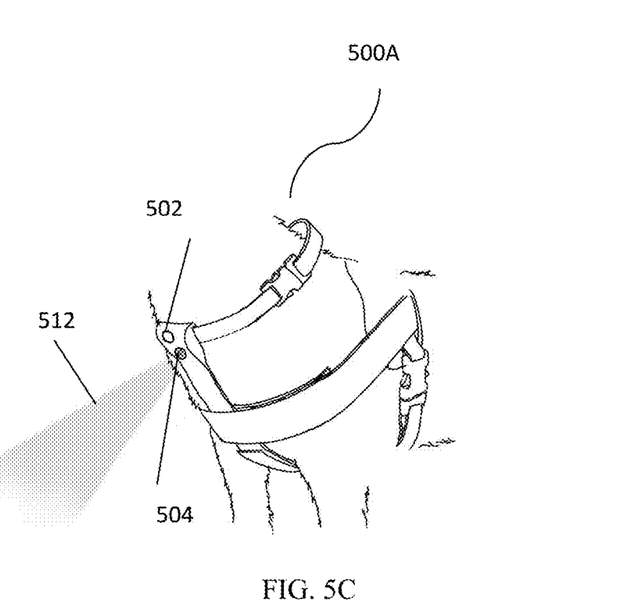

FIGS. 5A, 5B & 5C illustrate a portable communication device in the form of dog's harness. FIG. 5A shows front view of a dog's harness 500 comprises camera 502, lazer emitter 504 and strap 506 to tie with the dog's chest in accordance with third embodiment of the present invention. In the embodiment, the strap 506 is adjustable to according to chest size of the dog. The strap 506 includes clasps for easy locking. FIG. 5B shows rear side of the dog's harness 500 comprises power button 508 and speaker 510 in acorance to the exemplary embodiment of the invention. The power button 508 may be supported by rechargeable or non rechargeable battery. FIG. 5C illustrates an exemplary embodiment to show dog secured with dog's harness 500A in accordance to the invention. The FIG. 5C shows laser emitter 504 emits lazer rays 512 which may be captured by the camera 502 when a selection of buttons is performed by the dog in accordance to the invention. In the embodiment, the harness may be modified to be adjustable for other pets such as cats etc.

Figure 6:
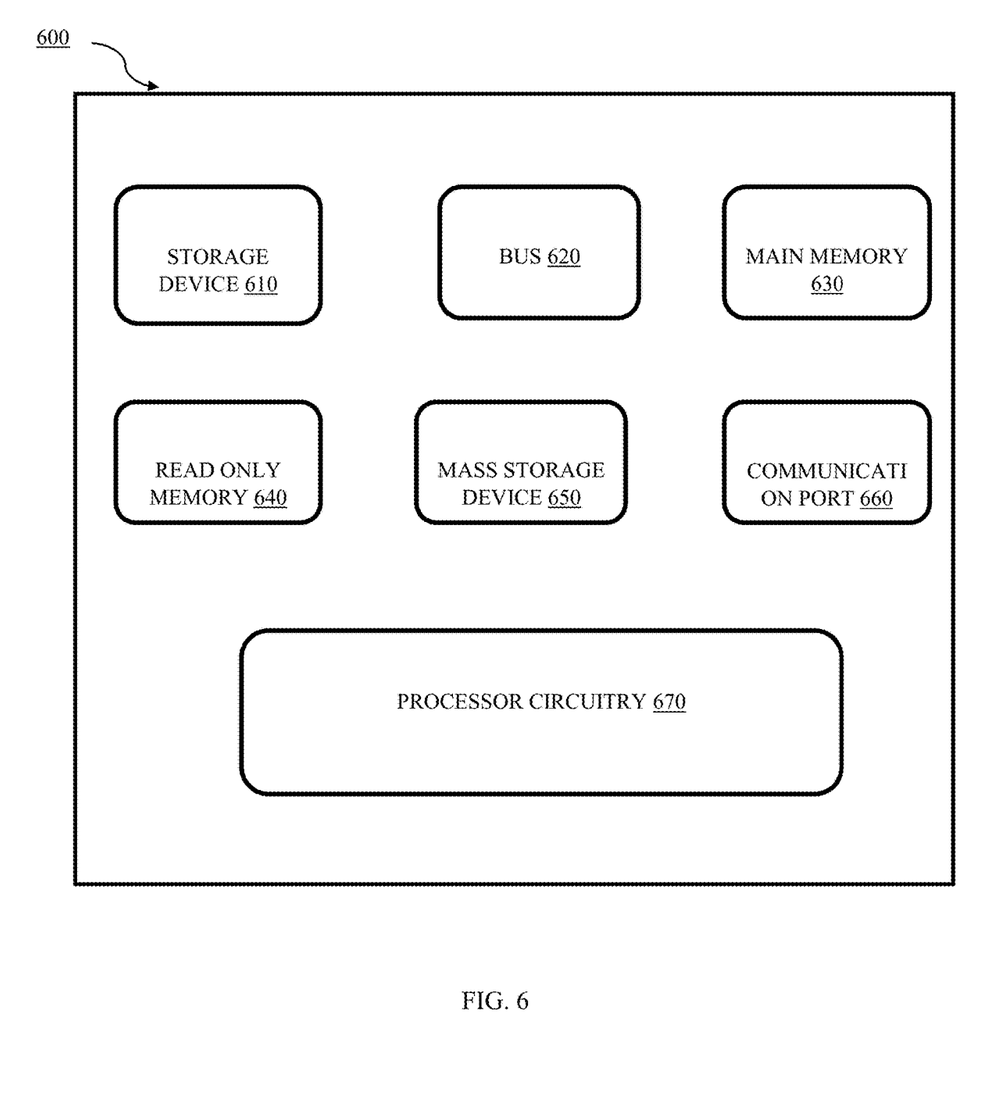
FIG. 6 illustrates an exemplary computer system in which or with which embodiments of the present invention may be utilized.

FIG. 6 illustrates an exemplary computer system in which or with which embodiments of the present invention may be utilized. Depending upon the particular implementation, the various process and communication blocks described above may be performed by hardware components, embodied in machine-executable instructions, which may be used to cause a general-purpose or special-purpose processor programmed with the instructions to perform the steps, or the steps may be performed by a combination of hardware, software, firmware and/or involvement of human participation/interaction. As shown in FIG. 6, the computer system includes an external storage device 610, a bus 620, a main memory 630, a read-only memory 640, a mass storage device 650, a communication port 660, and a processor 670.

Those skilled in the art will appreciate that computer system 600 may include more than one processing circuitry 670 and communication ports 660. The processing circuitry 670 should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quadcore, Hexa-core, or any suitable number of cores) or supercomputer. In some embodiments, processing circuitry 670 is distributed across multiple separate processors or processing units, for example, multiple of the same type of processing units (e.g., two Intel Core i7 processors) or multiple different processors (e.g., an Intel Core i5 processor and an Intel Core i7 processor).

Examples of processing circuitry 670 include, but are not limited to, an Intel® Itanium® or Itanium 2 processor(s), or AMD® Opteron® or Athlon MP® processor(s), Motorola® lines of processors, System on Chip (SoC) processors, or other future processors. Processing circuitry 670 may include various modules associated with embodiments of the present invention.

Communication port 660 may include a cable modem, Integrated Services Digital Network (ISDN) modem, a digital subscriber line (DSL) modem, a telephone modem, an Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of electronic devices or communication of electronic devices in locations remote from each other. The communication port 660 can be any of an RS-232 port for use with a modem-based dialup connection, a 10/100 Ethernet port, a Gigabit or 10 Gigabit port using copper or fiber, a serial port, a parallel port, or other existing or future ports. Communication port 660 may be chosen depending on a network, such as a Local Area Network (LAN), Wide Area Network (WAN), or any network to which the computer system connects.

Memory 630 may include Random Access Memory (RAM) or any other dynamic storage device commonly known in the art. Read-only memory 640 can be any static storage device(s), e.g., but not limited to, a Programmable Read-Only Memory (PROM) chips for storing static information, e.g., start-up or BIOS instructions for processing circuitry 670.

Mass storage 650 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) 10 recorders, BLU-RAY 3D disc recorders, digital video recorders (DVRs, sometimes called a personal video recorder or PVRs), solid-state devices, quantum storage devices, gaming consoles, gaming media, or any other suitable fixed or removable storage devices, and/or any combination of the same. Nonvolatile memory may also be used (e.g., to launch a boot-up routine and other instructions). Cloud-based storage may be used to supplement storage memory 630. Memory 650 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firmware interfaces), e.g., those available from Seagate (e.g., the Seagate Barracuda 7200 family) or Hitachi (e.g., the Hitachi Desk star 7K1000), one or more optical discs, Redundant Array of Independent Disks (RAID) storage, e.g., an array of disks (e.g., SATA arrays), available from various vendors including Dot Hill Systems Corp., LaCie, Nissan Technologies, Inc. and Enhance Technology, Inc.

Bus 620 communicatively connects processor(s) 670 with the other memory, storage, and communication blocks. Bus 620 can be, e.g., a Peripheral Component Interconnect (PCI) / PCI Extended (PCI-X) bus, Small Computer System Interface (SCSI), USB, or the like, for connecting expansion cards, drives, and other subsystems as well as other buses, such a front side bus (FSB), which connects processor 670 to a software system.

Optionally, operator and administrative interfaces, e.g., a display, keyboard, and a cursor control device, may also be coupled to bus 620 to support direct operator interaction with the computer system. Other operator and administrative interfaces can be provided through network connections connected through the communication port 660. An external storage device 610 can be any kind of external hard-drives, floppy drives, IOMEGA® Zip Drives, Compact Disc-Read-Only Memory (CD-ROM), Compact Disc-Re-Writable (CD-RW), Digital Video Disk-Read Only Memory (DVD-ROM). The components described above are meant only to exemplify various possibilities. In no way should the aforementioned exemplary computer system limit the scope of the present disclosure.

The computer system 600 may be accessed through a user interface. The user interface application may be implemented using any suitable architecture. For example, it may be a stand-alone application wholly implemented on the computer system 600. The user interface application and/or any instructions for performing any of the embodiments discussed herein may be encoded on computer-readable media. Computer-readable media includes any media capable of storing data. In some embodiments, the user interface application is a client server-based application. Data for use by a thick or thin client implemented on an electronic device computer system 600 is retrieved on-demand by issuing requests to a server remote to the computer system 600. For example, computing device 600 may receive inputs from the user via an input interface and transmit those inputs to the remote server for processing and generating the corresponding outputs. The generated output is then transmitted to the computer device 600 for presentation to the user.

While embodiments of the present invention have been illustrated and described, it will be clear that the invention is not limited to these embodiments only. Numerous modifications, changes, variations, substitutions, and equivalents, will be apparent to those skilled in the art without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular name.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document, the terms "coupled to" and "coupled with" are also used euphemistically to mean "communicatively coupled with" over a network, where two or more devices can exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprise" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions, or examples, which are included to enable a person having ordinary skill in the art to make and use the invention when combined with information and knowledge available to the person having ordinary skill in the art.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter outlined in the claims is not intended to be limited to the embodiments shown herein but is to be accorded to the widest scope consistent with the principles and novel features disclosed herein. It is contemplated that additional embodiments are within the spirit and true scope of the disclosed subject matter.

What is claimed is:

1. A portable communication device for initiating communication between dog and dog owner, comprising:
   an Infrared (IR) emitter module projecting a series of virtual buttons on a ground and displaying images of the virtual buttons that can be pressed by paw of the dog;
   a camera module recording angle of infrared light emitted by the IR emitter module;
   a sensor module receiving information of the angle of infrared light from the camera module and analyzing the information to determine location of the infrared light broken in order to indicate at least one virtual button selected by the dog from the series of virtual buttons; and
   a processor module initiating communication between the dog and the dog owner wherein the processor module being programmed with software-executable instructions, configured to:
      confirm selection made by the dog through pressing of the at least one virtual button by the paw of the dog; and
      pass information of the at least one virtual button selected by the dog to the dog owner.

2. The portable communication device as claimed in claim 1, wherein the IR emitter module is tilted vertically to adjust position of its display, thereby allowing the dog to easily see and touch the images of the series of virtual buttons.

3. The portable communication device as claimed in claim 1, wherein the portable communication device is collar of the dog or harness of the dog.

4. The portable communication device as claimed in claim 3, wherein each virtual button of the series of virtual buttons corresponds to a particular command or request, the command comprises inputs which include: water, food, play, outside, potty, walk, treat, yes, no, or any combination thereof.

5. The portable communication device as claimed in claim 1, wherein if the at least one virtual button selected by the dog, the infrared light emitted by the IR emitter module breaks and is reflected back towards the device.

6. The portable communication device as claimed in claim 1, wherein angle of the IR emitter module is adjusted in an upward or downward direction in order to project the series of virtual buttons within range of the paw of the dog.

7. The portable communication device as claimed in claim 1, further comprising a rechargeable battery and a power supply controlled by an ON/OFF switch.

8. The portable communication device as claimed in claim 1, wherein the images of the virtual buttons displayed comprise: star, square, parallelogram, circle, triangle, cross, arrow up, arrow down, heart or any combination thereof.

9. The portable communication device as claimed in claim 1, wherein each virtual button comprises a designated word so that the selection by the dog is understood by both the dog and the dog owner.

10. The portable communication device as claimed in claim 1, wherein the IR emitter module is activated either by the dog owner with press of the at least one virtual button or sound activated by the dog with a bark.

11. The portable communication device as claimed in claim 1, wherein the virtual buttons are displayed for up to 15 seconds for the dog to select the shape of the at least one virtual button before the at least one virtual button gets automatically turned off.

12. A method for initiating communication between dog and dog owner, the method comprising:
   projecting a series of virtual buttons on a ground;
   displaying images of the virtual buttons that can be pressed by paw of the dog;
   recording angle of infrared light emitted by Infrared (IR) emitter module;
   receiving information of the angle of infrared light from camera module and analyzing the information to determine location of the infrared light broken in order to indicate at least one virtual button selected by the dog from the series of virtual buttons;

confirming selection made by the dog through pressing of the at least one virtual button by the paw of the dog; and passing information of the at least one virtual button selected by the dog to the dog owner.

13. The method as claimed in claim 12, wherein each virtual button of the series of virtual buttons corresponds to a particular command or request.

14. The method as claimed in claim 13, wherein the command comprises inputs including: water, food, play, outside, potty, walk, treat, yes, no, or any combination thereof.

15. The method as claimed in claim 12, wherein if the at least one virtual button is selected by the dog, the infrared light emitted by the IR emitter module breaks and is reflected back towards communication device.

16. The method as claimed in claim 12, wherein the images of the virtual buttons displayed comprise: star, square, parallelogram, circle, triangle, cross, arrow up, arrow down, heart, or any combination thereof.

17. The method device as claimed in claim 12, wherein each virtual button comprises a designated word so that the selection by the dog is understood by both the dog and the dog owner.

18. The method as claimed in claim 12, wherein the IR emitter module is activated either by the dog owner with press of the at least one virtual button or sound activated by the dog with a bark.

19. The method as claimed in claim 12, wherein the virtual buttons are displayed for up to 15 seconds for the dog to select the shape of the at least one virtual button before the at least one virtual button gets automatically turned off.

20. A non-trasitory computer readable medium storing therein instructions for a portable communication device configured to perform a method for initiating communication between dog and dog owner, comprising:

projecting a series of virtual buttons on a ground;

displaying images of the virtual buttons that can be pressed by paw of the dog;

recording angle of infrared light emitted by Infrared (IR) emitter module;

receiving information of the angle of infrared light from camera module and analyzing the information to determine location of the infrared light broken in order to indicate at least one virtual button selected by the dog from the series of virtual buttons;

confirming selection made by the dog through pressing of the at least one virtual button by the paw of the dog; and passing information of the at least one virtual button selected by the dog to the dog owner.

* * * * *